United States Patent
Huang et al.

(10) Patent No.: US 9,548,931 B2
(45) Date of Patent: Jan. 17, 2017

(54) METHOD AND DEVICE FOR EVALUATING A TRAFFIC SHAPER

(71) Applicant: Telefonaktiebolaget L M Ericsson (publ), Stockholm (SE)

(72) Inventors: Vincent Huang, Sollentuna (SE); Rickard Cöster, Hägersten (SE); Mona Matti, Nacka (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 8 days.

(21) Appl. No.: 14/437,136

(22) PCT Filed: Oct. 23, 2012

(86) PCT No.: PCT/SE2012/051136
§ 371 (c)(1),
(2) Date: Apr. 20, 2015

(87) PCT Pub. No.: WO2014/065724
PCT Pub. Date: May 1, 2014

(65) Prior Publication Data
US 2015/0271079 A1    Sep. 24, 2015

(51) Int. Cl.
*G01R 31/08* (2006.01)
*H04L 12/815* (2013.01)
(Continued)

(52) U.S. Cl.
CPC ........... *H04L 47/22* (2013.01); *H04W 24/08* (2013.01); *H04W 52/02* (2013.01); *H04W 52/0222* (2013.01); *H04W 76/048* (2013.01)

(58) Field of Classification Search
CPC ............................ H04L 47/22; H04W 76/048
(Continued)

(56) References Cited

U.S. PATENT DOCUMENTS

2005/0009578 A1   1/2005  Liu
2007/0109179 A1*  5/2007  Werntz ................ G01S 7/2813
                                                        342/174

FOREIGN PATENT DOCUMENTS

WO    2011034476 A1   3/2011

* cited by examiner

*Primary Examiner* — Iqbal Zaidi
(74) *Attorney, Agent, or Firm* — Patent Portfolio Builders, PLLC

(57) ABSTRACT

The present invention relates to a method and device of evaluating a traffic shaper used for shaping at least two traffic flows of a mobile terminal operating according to a particular DRX setting in a mobile communications network. The method comprises the steps of acquiring an estimated lower bound of battery savings as a function of transmission rate of each traffic flow (f1, f2) of the at least two traffic flows for the mobile terminal according to the particular DRX setting. Further, the method comprises acquiring an estimated battery savings measure for said each traffic flow (f1, f2) before shaping, and acquiring an estimated battery savings measure for said each traffic flow (f1, f2) after shaping. Moreover, the method comprises calculating normalized traffic shaper gain as a relation between the estimated battery savings measure for the shaped traffic flow and the estimated battery savings measure for the unshaped traffic flow for said each traffic flow (f1, f2), said relation further being normalized with the respective estimated lower bound of battery savings, and determining whether to use the traffic shaper (S1) for said at least two traffic flows (f1, f2) on the basis of the calculated normalized traffic shaper gain.

20 Claims, 5 Drawing Sheets

(51) Int. Cl.
*H04W 52/02* (2009.01)
*H04W 24/08* (2009.01)
*H04W 76/04* (2009.01)

(58) Field of Classification Search
USPC .......... 370/252–253, 328–339; 375/224–267
See application file for complete search history.

METHOD AND DEVICE FOR EVALUATING A TRAFFIC SHAPER

TECHNICAL FIELD

The invention relates to a method and device for evaluating traffic shapers.

BACKGROUND

Discontinuous Reception (DRX) is a 3rd Generation Partnership Project (3GPP) standard in Long Term Evolution (LTE) to save battery in a user equipment (UE) such as a mobile phone, tablet, media player, laptop, etc., or any other appropriate mobile terminal with communication capability. DRX is a parameterized functionality that effects how the UE switches between ON and OFF reception states. DRX parameters are known to both the UE and the Radio Access Network (RAN), e.g., the eNodeB, the NodeB, or the Radio network Controller (RNC), with which the UE communicates. During the ON period, the UE is able to receive data packets. If no packet is received during the ON period, the UE switches to OFF after an inactivity timer has expired. During the OFF period, it is not possible to send data packets to the UE and packets have to be buffered in the eNodeB until the next ON period commences. When sending packets, the UE always transitions to the ON state. Numerous DRX settings are possible for best handling different types of data packet flows. Important performance characteristics for selecting DRX parameters are delay due to buffering in the eNodeB and battery saving in the UE.

Traffic shaping is a technique which delays some or all of the packets in a packet switched network, such as an Internet Protocol (IP) network, for the purpose of bringing the packets in compliance with a traffic profile. For example, if packets arrive with approximately fixed inter-arrival times, a traffic shaper could delay a group of packets and after some period of time send these as a burst of packets with virtually zero inter-arrival time. For resource utilization purposes, this strategy may be more efficient, for example for saving battery in the UE.

A problem in the art is how to evaluate the performance of a traffic shaper in terms of quality or "goodness" according to reasonably objective standards, for the purpose of finding an optimal or near optimal shaper under given traffic conditions. The quality of a particular traffic shaper may be quantified in a number of ways, where the most intuitive and straightforward measure is to quantify how much resource gain is achieved with the shaper without sacrificing quality of experience of the user. If the resource gain is higher with the shaper than without, it can be concluded that the particular shaper brings and added value. Although it can be determined whether the utilization of a particular shaper is better than not using a shaper at all for a certain traffic flow, it would also be desirable to be able to compare different shapers for finding the best one for the certain traffic flow.

SUMMARY

An object of the present invention is to solve, or at least mitigate this problem in the art and provide an improved method and device for evaluating traffic shapers.

This objective is attained in a first aspect of the present invention by a method of evaluating a traffic shaper used for shaping at least two traffic flows of a mobile terminal operating according to a particular DRX setting in a mobile communications network. The method comprises the steps of acquiring an estimated lower bound of battery savings as a function of transmission rate of each traffic flow of the at least two traffic flows for the mobile terminal according to the particular DRX setting. Further, the method comprises acquiring an estimated battery savings measure for said each traffic flow before shaping, and acquiring an estimated battery savings measure for said each traffic flow after shaping. Moreover, the method comprises calculating normalized traffic shaper gain as a relation between the estimated battery savings measure for the shaped traffic flow and the estimated battery savings measure for the unshaped traffic flow for said each traffic flow, said relation further being normalized with the respective estimated lower bound of battery savings, and determining whether to use the traffic shaper for said at least two traffic flows on the basis of the calculated normalized traffic shaper gain.

This objective is attained in a second aspect of the present invention by a device for evaluating a traffic shaper used for shaping at least two traffic flows of a mobile terminal operating according to a particular DRX setting in a mobile communications network. The device comprises a processing unit being arranged to acquire an estimated lower bound of battery savings as a function of transmission rate of each traffic flow of the at least two traffic flows for the mobile terminal according to the particular DRX setting of the mobile terminal, acquire an estimated battery savings measure for said each traffic flow before shaping, and acquire an estimated battery savings measure for said each traffic flow after shaping. The processing unit is further arranged to calculate normalized traffic shaper gain as a relation between the estimated battery savings measure for the shaped traffic flow and the estimated battery savings measure for the unshaped traffic flow for said each traffic flow, which relation further is normalized with the respective estimated lower bound of battery savings, and determine whether to use the traffic shaper for said at least two traffic flows on the basis of the calculated normalized traffic shaper gain.

Advantageously, by calculating a traffic shaper gain taking into account an estimated battery savings measure for a respective one at least two traffic flows before traffic shaping is undertaken, i.e. an estimate of battery savings as a result of DRX a compared to a traffic situation where DRX is not utilized, and taking into account an estimated battery savings measure for each traffic flow after shaping, it is possible to determine a quality measure for the traffic shaper. Further, by normalizing the traffic shaper gain—thus creating a normalized traffic shaper gain—with an acquired estimated lower bound of battery savings as a function of transmission rate of said each traffic flow for a mobile terminal according to a particular DRX setting to which the mobile terminal is subject, a more objective measure of quality is acquired for the traffic shaper given the traffic flows processed by the shaper and the particular DRX setting utilized.

As an example, if one traffic flow transmits one packet per second and has associated with it an estimated battery savings measure of 10, while another traffic flow transmits ten packets per second and has an estimated battery saving of 5, it is not reasonable to objectively compare the battery savings of the two traffic flows. It is not correct to state that the first flow results in twice the battery savings of the second flow; the transmission rate of for each of the traffic flows must be considered.

The battery savings is generally expressed as the ratio between the length of the OFF and ON periods for the traffic flows in DRX mode. Typically, the battery savings of a mobile terminal for a given DRX setting is inversely proportional to the transmission rate of the mobile terminal.

Thus, the quality measure of the traffic shaper in the form of the calculated normalized traffic shaper gain advantageously further implicitly takes into account the transmission rate by acquiring the estimated lower bound of battery savings for each of the traffic flows.

The traffic shaper may be implemented in one of many network nodes, e.g. in an RNC, a radio base station (RBS) such as an eNodeB or a NodeB, a base station controller (BSC), etc, or even outside a radio access network (RAN), such as in a proxy server buffering data supplied for instance by a media provider. The traffic shaper may even be embodied in the form of a processing unit implemented in the actual mobile terminal itself. Thus, traffic shaping is a viable option in both downlink and uplink communication.

In an embodiment of the present invention, the normalized traffic shaper gain is calculated as a sum of ratios between the estimated battery savings measure for the shaped traffic flow and the estimated battery savings measure for the unshaped traffic flow for said at least two traffic flows, each ratio further being normalized with the respective lower bounds of battery savings. This embodiment is illustrated with an example in the following.

Assume that two traffic flows f1 and f2 are to be provided to a mobile terminal. Two traffic shapers S1 and S2 are implemented at e.g. a NodeB with which the mobile terminal communicates. Thus, the NodeB receives packet data to be transmitted to the mobile terminal but shapes the packet data before sending the data to the mobile terminal using a preferred evaluated traffic shaper. An estimated battery savings measure before shaping is 10 for both the first and the second traffic flow f1 and f2, respectively. The estimated battery savings measure using a first shaper S1 is 30 for both the first and the second traffic flow f1 and f2, respectively. The estimated battery savings measure using a second shaper S2 is 40 for the first traffic flow f1 and 20 for the second traffic flow f2.

In this particular exemplifying embodiment, the gain G of each traffic shaper is defined as the sum of the ratios between the estimated shaped (SB) and unshaped (UB) battery savings measure for each traffic flow f1 and f2, i.e.:

$$G(S) = \sum_{i=1}^{n} \frac{SB_i}{UB_i},$$

where i denotes traffic flow.

For this particular example, the gain of each shaper S1 and S2 will be:

$G(S1)=30/10+30/10=6,$ $G(S2)=40/10+20/10=6.$

Thus, it cannot be deducted which one of the shapers is best although they both are clearly better than not shaping at all.

Thus, according to embodiments of the present invention, this problem is solved by defining a normalized traffic shaper gain NG as:

$$NG(S) = \sum_{i=1}^{n} \frac{SB_i - LB_{r(i)}}{UB_i - LB_{r(i)}},$$

where r denotes transmission rate for traffic flow i.

$LB_{r(i)}$ is the estimated lower bound on battery savings for a traffic flow i with transmission rate r.

In this example, it is assumed that the estimated lower bound of battery savings is 5 for the first traffic flow f1, and 2 for the second traffic flow f2 for the particular DRX setting of the mobile terminal. As the lower bound is an inverse function of transmission rate, this means that since the lower bound for the second traffic flow f2 is lower than that for the first traffic flow f1, the second flow f2 has higher transmission rate.

Thus, taking into account the estimated lower bound of battery savings as a function of transmission rate of each of the two traffic flows for the mobile terminal according to the particular DRX setting of the mobile terminal, a normalized traffic shaper gain for the traffic shapers S1 and S2 can be calculated:

$NG(S1)=(30-5)/(10-5)+(30-2)/(10-2)=8.5,$ $NG(S2)=(40-5)/(10-5)+(20-2)/(10-2)=9.25.$

Using the normalized gain, it can be concluded that for these traffic flows and the given DRX settings, the second traffic shaper S2 is preferred over the first traffic shaper S1, since the total gain is higher, and the present invention facilitates objective evaluation of the performance of a traffic shaper in terms of quality or goodness, for the purpose of finding an optimal or near optimal shaper under given traffic conditions.

As can be deducted from the above, in this particular embodiment of the present invention, the relation between the estimated battery savings measure for the shaped traffic flow and the estimated battery savings measure for the unshaped traffic flow for said each traffic flow is calculated as a sum of ratios between the estimated battery savings measure for the shaped traffic flow and the estimated battery savings measure for the unshaped traffic flow for said at least two traffic flows, which ratios further are normalized with the respective estimated lower bound of batter savings.

However, a number of different approaches of defining the relation between the estimated battery savings measure for the shaped traffic flow and the estimated battery savings measure for the unshaped traffic flow for the traffic flows to be used as inputs to the traffic shaper(s) can be envisaged.

In an embodiment of the present invention, at least two traffic shapers are evaluated as in the exemplifying embodiment illustrated hereinabove, wherein the one having the highest calculated normalized traffic shaper gain is selected for shaping the at least two traffic flows. However, in an alternative embodiment, one traffic shaper is evaluated, and if the calculated normalized traffic shaper gain is considered sufficiently high, e.g. if the normalized traffic shaper gain exceeds a shaper gain threshold value, the evaluated traffic shaper may be evaluated without any comparison with further traffic shapers. This may be advantageous where timing is critical and the battery savings are considered good enough if they exceed a certain value (corresponding to the threshold value).

In a further embodiment of the present invention, for each of a number of different DRX settings, battery savings are modelled as a function of transmission rate of a traffic flow for the mobile terminal. Thereafter, the estimated lower bound of battery savings for a particular traffic flow can be acquired by deriving required data from the created model.

It should be noted that if the traffic shaper evaluation according to embodiments of the present invention is undertaken e.g. at a NodeB before the NodeB transfers shape data to the mobile terminal, the actual modelling of the battery savings could be undertaken further up in the RAN, e.g. at the RNC, or even at an appropriate network entity located in the core network, such as a proxy sever, from which the NodeB acquires the estimated lower bound of battery savings for a particular traffic flow.

Thus, when modelling the battery savings, a training phase is initiated where a large amount of data is sent to a mobile terminal from e.g. the NodeB or the RNC, varying transmission rates and altering DRX settings, and actual values on battery savings are derived from the mobile terminal. When a sufficient amount of measurement data has been deducted from the mobile terminal, the battery savings can be modelled as a function of transmission rate of the data sent for different DRX settings. This phase could be undertaken once, but may alternatively be continuously repeated such that the created model always is up-to-date with respect to current measurement data.

In an embodiment, the lower bound of battery savings is as a rough estimate modelled as being inversely proportional to the transmission rate of the traffic flow. For each of the used DRX settings, the lower bound of the battery savings can e.g. be found by computing the so called convex hull. Then, curve matching is employed to find the best function to fit the boundary, where for instance linear or polynomial fitting is utilized.

In an embodiment of the present invention, the model for the lower bound of battery savings is chosen as:

$$LB_r = \frac{a}{b+r} + c,$$

where LB is the lower bound, r is the traffic transmission rate and a, b and c are parameters specific for each particular DRX setting. Using for instance a neural network model is one of many possible methods to compute the lower bound.

As mentioned, a less elaborate model for the lower bound of battery savings could be chosen as being inversely proportional to the transmission rate of the traffic flow:

$$LB_r = \frac{a}{r}.$$

In this context, it should be noted that a wide variety of models selected for estimating the lower bound of battery savings can be envisaged.

It is noted that the invention relates to all possible combinations of features recited in the claims. Further features of, and advantages with, the present invention will become apparent when studying the appended claims and the following description. Those skilled in the art realize that different features of the present invention can be combined to create embodiments other than those described in the following.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art.

Figure 1:
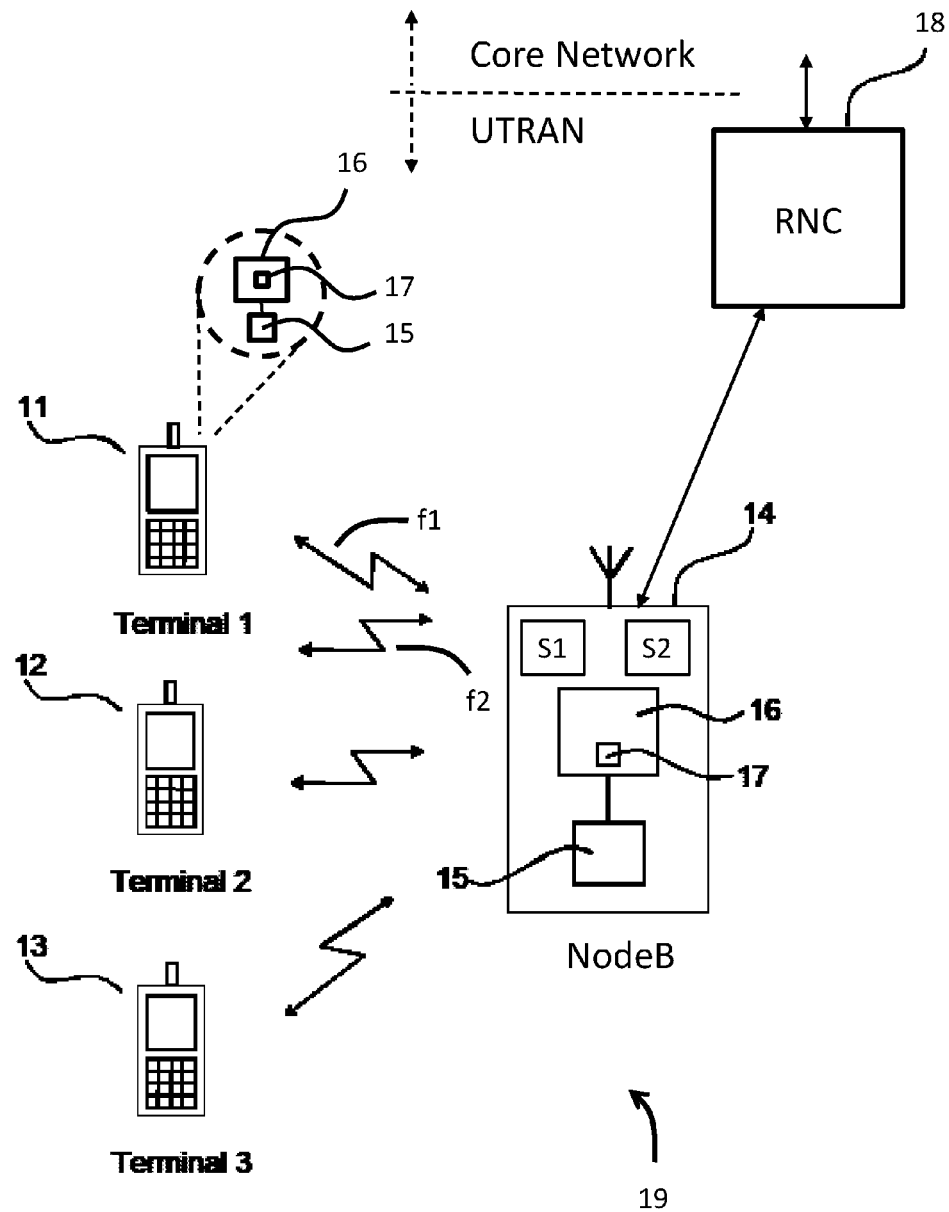
FIG. 1 illustrates a communications network in which the present invention may be implemented.

FIG. 1 illustrates a network 19 of mobile terminals 11, 12, 13 also referred to as user equipment (UE) communicating with a device 14 in the form of a NodeB (i.e. a base station), which in its turn communicates with a supervising entity in the form of an RNC 18. The RNC along with the NodeB make up the Universal Terrestrial Radio Access Network (UTRAN). This communications network is commonly referred to as 3G (3rd Generation Wireless Mobile Communication Technology), and facilitates connectivity between the mobile terminals 11, 12, 13 and the core network. The network of FIG. 1 is an example of a network in which the present invention advantageously may be implemented. As previously has been discussed, traffic shaping could be used in both uplink and downlink communication. Thus the method of evaluating traffic shapers according to embodiments of the present invention could be undertaken at the mobile terminal(s) 11, 12, 13 transmitting data in the uplink to the NodeB 14 as well as at e.g. the RNC 18 in case of a 3G network or in a core network Mobility Management Entity (MME) in case of a Long Term Evolution (LTE) network (in which the radio base station is referred to as eNodeB), and the NodeB 14 transmitting data in the downlink to the mobile terminal(s) 11, 12, 13, or LTE Advanced being a development of the LTE standard.

With reference again to FIG. 1, whether the present invention is implemented at a mobile terminal 11, 12, 13 or a NodeB 14 (or any other appropriate device), the method of evaluating traffic shapers according to different embodiments of the present invention is in practice controlled by a processing unit 15 embodied in the form of one or more microprocessors arranged to execute a computer program 17 downloaded to a suitable storage medium 16 associated with the microprocessor, such as a Random Access Memory (RAM), a Flash memory or a hard disk drive. The processing unit 15 is arranged to at least partly carry out the method according to embodiments of the present invention when the appropriate computer program 17 comprising computer-executable instructions is downloaded to the storage medium 16 and executed by the processing unit 15. The storage medium 16 may also be a computer program product comprising the computer program 17. Alternatively, the computer program 17 may be transferred to the storage medium 16 by means of a suitable computer program product, such as a floppy disk or a memory stick. As a further alternative, the computer program 17 may be downloaded to the storage medium 16 over a network. The processing unit 15 may alternatively be embodied in the form of an application specific integrated circuit (ASIC), a field-programmable gate array (FPGA), a complex programmable logic device (CPLD), etc.

Figure 2:
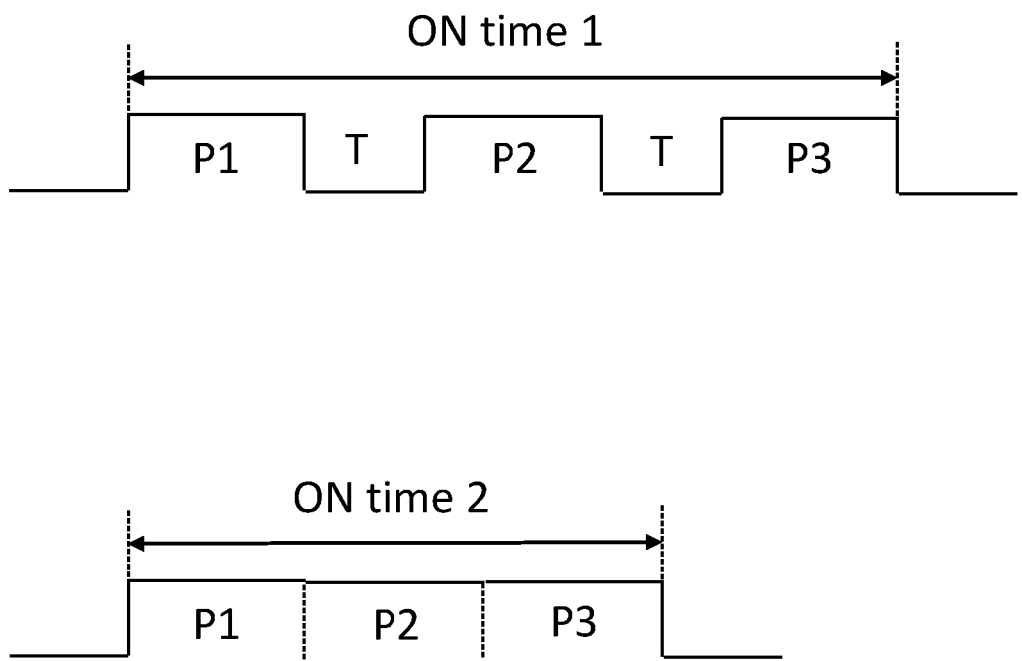
FIG. 2 shows packet data before and after traffic shaping.

With reference to FIG. 2, it is assumed that e.g. the NodeB 14 receives packet data comprising packets P1, P2 and P3 with fixed intervals T. A traffic shaper of the NodeB 14, typically embodied by the processing unit 15 executing an appropriate computer program 17 may then buffer the packets P1, P2 and P3 in memory 16 and subsequently transmit the packets to a mobile terminal 11 with a delay but without any intervals T between the packets P1, P2 and P3. If the sequence of data packets had not been shaped at the NodeB 14 but directly had been forwarded to the mobile terminal 11, the mobile terminal would have had been active in receiving the data packets P1, P2 and P3 for time period ON time 1 before possibly transiting to a battery saving idle mode. Now, since the NodeB 14 shapes the packets P1, P2 and P3 and thus eliminates the intervals T, the mobile terminal 11 will only have to be active in receiving the packets for time period ON time 2 and can subsequently transit to the battery saving idle mode. Thus, the length of the time periods when the mobile terminal is active in receiving data has a great impact on resource consumption, e.g. mobile terminal battery power and radio resources, in the UTRAN. Hence, traffic shaping—typically complemented in the communications network with DRX functionality—is of major importance for decreasing network resource consumption.

Figure 3:
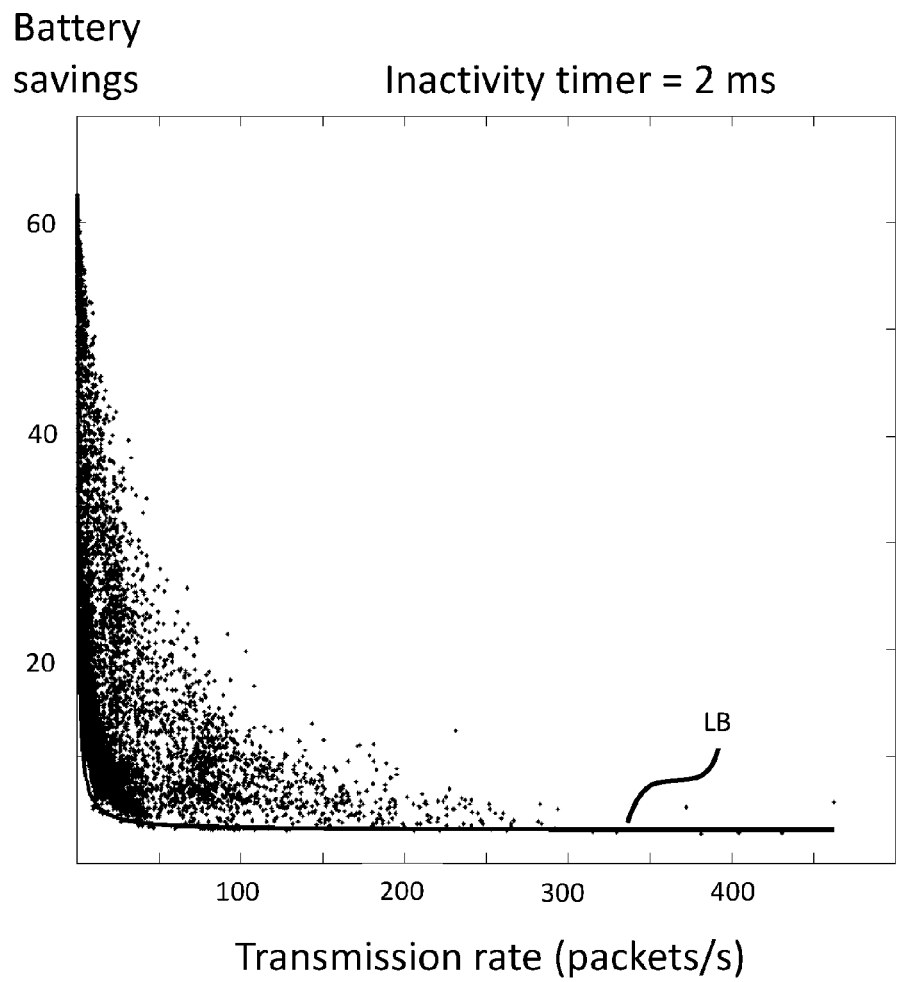
FIG. 3 shows a graph illustrating battery savings in a mobile terminal as a function of transmission rate of data sent to the mobile terminal for a particular DRX setting according to an embodiment of the present invention.

FIG. 3 shows a graph illustrating battery savings in a mobile terminal 11 as a function of transmission rate of data sent from e.g. a NodeB 14 to the mobile terminal 11 for a particular DRX setting of the mobile terminal according to an embodiment of the present invention. The graph contains thousands of actual measurements of battery saving at the mobile terminal for various transmission rates. In FIG. 3, the particular DRX setting is "Inactivity timer=2 ms", implying that if no packet is received while the mobile terminal 11 is in an ON mode, the mobile terminal switches to an OFF mode after the inactivity timer has expired. As can be deducted from the graph, for lower transmission rates of the traffic flows, the battery savings measure peaks at about 60, i.e. the mobile terminal is oftentimes in OFF mode indicating extended data packets as explained with reference to FIG. 2. Further, it can be seen in the graph that the minimum battery savings achieved is approximately 5, i.e. the mobile terminal is more or less constantly in ON mode since packets continuously are sent to the terminal. As further can be seen in the graph, in an embodiment of the present invention, a lower bound LB of battery savings are modelled from the measurement data.

Figure 4:
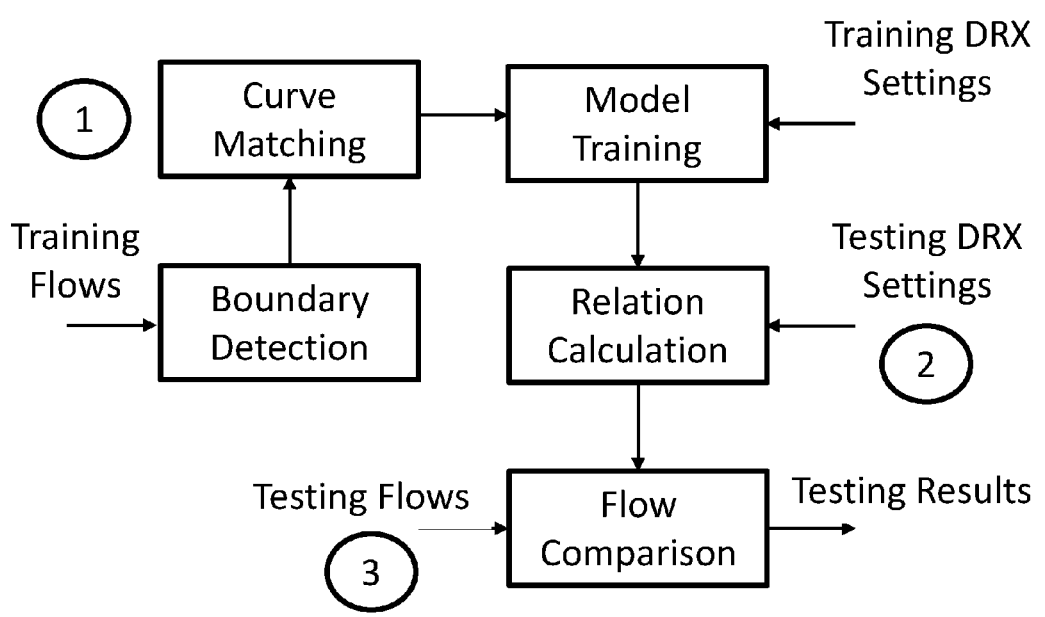
FIG. 4 illustrates a process of modeling lower bound of the battery savings of FIG. 3 according to an embodiment of the present invention.

Thus, with reference to FIG. 4, to model the lower bound LB of battery savings, the following process may be undertaken. During a first training phase, a large number of traffic flows are transmitted to the mobile terminal 11 from e.g. the NodeB 14, wherein the battery savings of the mobile terminal 11 for each traffic flow transmission rate is registered for a plurality of mobile terminal DRX settings (where a specific DRX setting is shown in FIG. 3). This means that for every transmission rate of a traffic flow submitted from the NodeB 14 to the mobile terminal 11, a corresponding battery savings measure is registered (for a desired DRX setting). For each DRX setting of the mobile terminal, the lower boundary LB of the battery savings can e.g. be found by computing the so called convex hull. Then, curve matching is employed to find the best function to fit the boundary, where for instance linear or polynomial fitting is utilized.

As previously mentioned, in an embodiment of the present invention, the model for the lower bound of battery savings is chosen as:

$$LB_r = \frac{a}{b+r} + c, \qquad \text{equation (1)}$$

where LB is the lower bound, r is the traffic transmission rate and a, b and c are parameters specific for each particular DRX setting. Thus, in this particular exemplifying embodiment of the present invention, equation (1) is considered to be the best fit. Thereafter, model training commences, where the model of equation (1) is trained with various DRX settings, in order to find out the parameters a, b and c for each particular DRX setting.

In a second relation calculation phase, the trained model, i.e. equation (1) with numerical values assigned to the parameters a, b and c is employed to calculate the lower boundary of battery savings for any desired DRX setting for the mobile terminal. Finally, when the lower bound of battery savings has been calculated for each DRX setting, the lower bound can be used to evaluate the performance of traffic shaping of different traffic flows in a third traffic flow evaluation phase.

Figure 5:
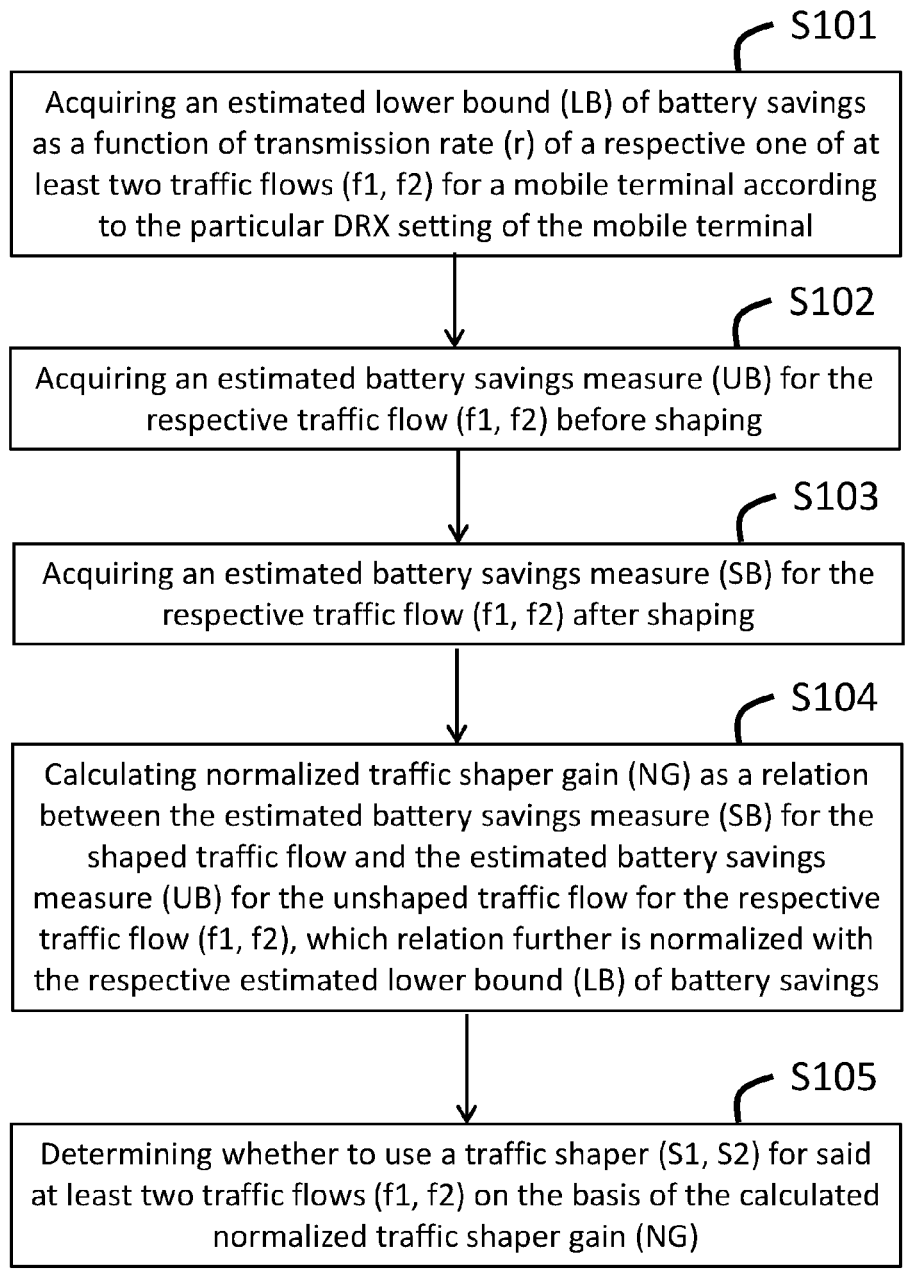
FIG. 5 shows a flowchart illustrating the method of evaluating a traffic shaper according to an embodiment of the present invention.

In the following, the traffic flow evaluation phase will be discussed in more detail with reference to FIG. 5 showing a flowchart illustrating the method of evaluating traffic shapers according to an exemplifying embodiment of the present invention. Thus, at this stage, the lower bound of battery savings has already been calculated for each of the DRX settings.

Assume that two traffic flows f1 and f2 are to be transmitted from the NodeB 14 to the mobile terminal 11. Two traffic shapers S1 and S2 are implemented at the NodeB 14. Thus, the NodeB receives packet data to be transmitted to the mobile terminal but shapes the packet data before sending the data to the mobile terminal using a preferred evaluated traffic shaper, for instance to accomplish the type traffic shaping illustrated in FIG. 2. It can be envisaged that the first traffic flow f1 e.g. comprises the three data packets P1, P2 and P3 separated by intervals T, while the second traffic flow f2 e.g. comprises the three data packets P1, P2 and P3 separated by smaller intervals T−t. The transmission rate of the second traffic flow f2 is thus greater than that of the first traffic flow f1.

An estimated battery savings measure before shaping is 10 for both the first and the second traffic flow f1 and f2, respectively. The estimated battery savings measure using the first shaper S1 is 30 for both the first and the second traffic flow f1 and f2, respectively. The estimated battery savings measure using the second shaper S2 is 40 for the first traffic flow f1 and 20 for the second traffic flow f2.

The gain G of the each traffic shaper is defined as the sum of the ratios between the estimated shaped (SB) and unshaped (UB) battery savings measure for each traffic flow f1 and f2, i.e.:

$$G(S) = \sum_{i=1}^{2} \frac{SB_i}{UB_i},$$

For this particular example, the gain of the two shapers S1 and S2 will be:

$G(S1)=30/10+30/10=6$, $G(S2)=40/10+20/10=6$.

Thus, for the two traffic flows f1 and f2 shaped at the NodeB 14 by shapers S1 and S2 and transmitted to the mobile terminal 11, neither can be said to be any better than the other. However, using the two shapers is, with respect to mobile terminal battery savings, better than not using any traffic shapers at all.

In the embodiment of the method of the present invention illustrated with the flowchart of FIG. 5, an estimated lower bound of battery savings is acquired in step S101 by the NodeB 14 as a function of transmission rate of the each of the two traffic flows f1, f2 for the mobile terminal 11 according to the particular DRX setting of the mobile terminal. This is undertaken for instance by means of actually calculating the lower bound LB according to equation (1) with the previously derived numerical values assigned to the parameters a, b and c for any desired DRX setting for the mobile terminal, or by turning to a look-up table where a large number of lower bound values already have been calculated.

Further, in step S102, the NodeB 14 acquires an estimated battery savings measure UB for each of the two traffic flows f1, f2 of the mobile terminal 11 before shaping, and in step S103, the NodeB acquires an estimated battery savings measure SB for each of the two traffic flows f1, f2 of the mobile terminal after shaping. It should be understood that the steps S101, S102 and S103 could be performed in any order.

Thus, according to this particular embodiment of the present invention, the problem in the art of evaluating a traffic shaper by a more objective standard is solved by defining a normalized traffic shaper gain NG as:

$$NG(S) = \sum_{i=1}^{n} \frac{SB_i - LB_{r(i)}}{UB_i - LB_{r(i)}},$$

Where $LB_{r(i)}$ is the estimated lower bound on battery savings for a traffic flow i with transmission rate r.

As mentioned hereinabove, it was assumed that the transmission rate of the second traffic flow f2 is greater than that of the first traffic flow f1. It is further assumed that the estimated lower bound LB of battery savings is 5 for the first traffic flow f1 and 2 for the second traffic flow f2 for the particular DRX setting of the mobile terminal 11. As the lower bound is an inverse function of transmission rate, this is expected since the second traffic flow f2 has a higher transmission rate than the first traffic flow f1.

To conclude, with reference again to FIG. 5, the NodeB 14 calculates the normalized traffic shaper gain NG as a relation between the estimated battery savings measure SB for the shaped traffic flow and the estimated battery savings measure UB for the unshaped traffic flow for each of the two traffic flows f1, f2, the relation further being normalized with the respective estimated lower bound LB of battery savings, where in this particular embodiment the normalized traffic shaper gain NG is calculated as a sum of ratios between the estimated battery savings measure SB for the shaped traffic flow and the estimated battery savings measure UB for the unshaped traffic flow for the two traffic flows f1, f2. Each ratio is further being normalized with the respective estimated lower bound LB of battery savings.

Thus, by having the NodeB 14 take into account the estimated lower bound LB of battery savings as a function of transmission rate of the first f1 and second f2 traffic flow for the mobile terminal 11 according to the particular DRX setting of the mobile terminal, a normalized traffic shaper gain for the two traffic shapers S1 and S2 is calculated in step S104 as:

$$NG(S1)=(30-5)/(10-5)+(30-2)/(10-2)=8.5,$$

$$NG(S2)=(40-5)/(10-5)+(20-2)/(10-2)=9.25.$$

Using the normalized gain, it can be concluded that for the two traffic flows f1, f2 and the given DRX settings, the second traffic shaper S2 is preferred over the first traffic shaper S1, since the total gain is higher for the traffic shaper S2, and the present invention facilitates objective evaluation of the performance of a traffic shaper in terms of quality or goodness, for the purpose of finding an optimal or near optimal shaper under given traffic conditions.

In this particular exemplifying embodiment, it can intuitively be realized why the traffic shaper S2 would be preferred over traffic shaper S1, since increasing the battery savings for a traffic flow with low transmission rate is more likely to lead to a larger relative increase in gain than if the flow would have high rate in that the battery savings—which follow the curve shown in FIG. 4—increase steeply as the transmission rate approaches zero.

Finally, in step S105, the NodeB 14 determines whether to use an evaluated traffic shaper for the two traffic flows f1, f2 on the basis of the calculated normalized traffic shaper gain NG. In this context is should be mentioned that two more traffic shapers S1, S2 not necessarily is evaluated to determine which one of the two traffic shapers to use. To the contrary, it is possible that the aim of an evaluation is to find a single traffic shaper, the normalized gain of which should exceed a predetermined threshold value.

For instance, in an example, the threshold value is set to 9, wherein a first traffic shaper S1 is evaluated and tested against the threshold value. It is thus determined that the first traffic shaper S1 is not good enough, wherein a second traffic shaper S2 is evaluated according to the above and passes the test since the normalized gain of S2 exceeds the predetermined threshold value.

It should be noted that the present invention can be used for other purposes than just evaluating traffic shapers, which purposes are within the scope of the appended claims. With reference to the graph illustrated in FIG. 4, the calculated lower bound LB of battery savings as a function of traffic flow transmission rate for a particular DRX setting can be used in many different ways. For instance, (a) the relation battery savings and transmission rate can be found for any DRX setting, which relation can be used for optimizing network resources, (b) battery saving performance can be compared for traffic flows having different transmission rates, (c)

Hence, the calculated lower bound LB of battery savings as a function of traffic flow transmission rate for a particular DRX setting can be used on a general note for reducing resource utilization in a network node, such as the NodeB or RNC or in the mobile terminal.

Even though the invention has been described with reference to specific exemplifying embodiments thereof, many different alterations, modifications and the like will become apparent for those skilled in the art. The described embodiments are therefore not intended to limit the scope of the invention, as defined by the appended claims.

The invention claimed is:

1. A method of evaluating a traffic shaper used for shaping at least two traffic flows of a mobile terminal operating according to a particular discontinuous reception (DRX) setting in a mobile communications network, the method comprising:
    acquiring an estimated lower bound (LB) of battery savings as a function of transmission rate of each traffic flow of the at least two traffic flows for the mobile terminal according to the particular discontinuous reception (DRX) setting of the mobile terminal;
    acquiring an estimated battery savings measure (UB) for said each traffic flow;
    shaping said each traffic flow;
    acquiring an estimated battery savings measure (SB) for said each traffic flow after the shaping of said each traffic flow;
    calculating normalized traffic shaper gain (NG) as a relation between the estimated battery savings measure (SB) and the estimated battery savings measure (UB) for said each traffic flow, said relation further being normalized with the respective estimated lower bound of battery savings; and
    determining whether to use the traffic shaper for said at least two traffic flows on the basis of the calculated normalized traffic shaper gain.

2. The method of claim 1, wherein the normalized traffic shaper gain is calculated as a sum of ratios between the estimated battery savings measure (SB) and the estimated battery savings measure (UB) for said at least two traffic flows, each ratio further being normalized with the respective estimated lower bound of battery savings.

3. The method of claim 1, wherein at least a further traffic shaper is evaluated, the method further comprising:
    comparing the at least two evaluated traffic shapers on the basis of the calculated normalized traffic shaper gain for each traffic shaper, wherein determining whether to use the traffic shaper comprises:
    selecting the one of the at least two traffic shapers having the highest calculated normalized traffic shaper gain for shaping the at least two traffic flows.

4. The method of claim 1, further comprising comparing the calculated normalized traffic shaper gain to a shaper gain threshold value, wherein the traffic shaper is used if the calculated normalized traffic shaper gain exceeds the shaper gain threshold value.

5. The method of claim 1, further comprising modeling, for each of a number of different discontinuous reception (DRX) settings, battery savings as a function of transmission rate of a traffic flow for the mobile terminal, wherein said acquired estimated lower bound of battery savings is derived from the modelled battery savings.

6. The method of claim 5, wherein the lower bound of battery savings are modeled as being inversely proportional to the transmission rate of the traffic flow.

7. The method of claim 6, further comprising:
    transmitting a plurality of mobile terminal traffic flows having different transmission rates for a particular discontinuous reception (DRX) setting;
    registering a battery savings measure of the mobile terminal for each transmission rate; and
    modeling the lower bound of the battery savings using curve fitting.

8. The method of claim 5, wherein the model for the lower bound of battery savings is chosen as:

$$LB_r = \frac{a}{b+r} + c,$$

where $LB_r$ is the lower bound, r is traffic flow transmission rate and a, b, and c, are parameters specific for each particular discontinuous reception (DRX) setting.

9. The method of claim 8, further comprising finding numerical values of the parameters a, b, and c, of the modelled lower bound $LB_r$ of the battery savings using machine learning.

10. A device for evaluating a traffic shaper used for shaping at least two traffic flows of a mobile terminal operating according to a particular discontinuous reception (DRX) setting in a mobile communications network, the device comprising a processing circuit configured to:
    acquire an estimated lower bound of battery savings as a function of transmission rate of each traffic flow of the at least two traffic flows for the mobile terminal according to the particular discontinuous reception (DRX) setting of the mobile terminal;
    acquire an estimated battery savings measure (UB) for said each traffic flow;
    shaping said each traffic flow;
    acquire an estimated battery savings measure (SB) for said each traffic flow after the shaping of said each traffic flow;
    calculate normalized traffic shaper gain as a relation between the estimated battery savings measure (SB) and the estimated battery savings measure (UB) for said each traffic flow, said relation further being normalized with the respective estimated lower bound of battery savings; and
    determine whether to use the traffic shaper for said at least two traffic flows on the basis of the calculated normalized traffic shaper gain.

11. The device of claim 10, wherein the normalized traffic shaper gain is calculated as a sum of ratios between the estimated battery savings measure (SB) and the estimated battery savings measure (UB) for said at least two traffic flows, each ratio further being normalized with the respective estimated lower bound of battery savings.

12. The device of claim 10, wherein at least a further traffic shaper is evaluated, the processing circuit being further configured to:
    compare the at least two evaluated traffic shapers on the basis of the calculated normalized traffic shaper gain for each traffic shaper, wherein the determining whether to use the traffic shaper comprises:
    select the one of the at least two traffic shapers having the highest calculated normalized traffic shaper gain for shaping the at least two traffic flows.

13. The device of claim 10, the processing circuit being further configured to compare the calculated normalized traffic shaper gain to a shaper gain threshold value, wherein the traffic shaper is used if the calculated normalized traffic shaper gain exceeds the shaper gain threshold value.

14. The device of claim 10, the processing circuit being further configured to model, for each of a number of different discontinuous reception (DRX) settings, battery savings as a function of transmission rate of a traffic flow for the mobile terminal, wherein said acquired estimated lower bound of battery savings is derived from the modelled battery savings.

15. The device of claim 14, wherein the lower bound of battery savings are modelled as being inversely proportional to the transmission rate of the traffic flow.

16. The device of claim 15, the processing circuit being further configured to:
- transmit a plurality of mobile terminal traffic flows having different transmission rates for a particular discontinuous reception (DRX) setting;
- register a battery savings measure of the mobile terminal for each transmission rate; and
- model the lower bound of the battery savings using curve fitting.

17. The device of claim 14, wherein the model for the lower bound of battery savings is chosen as:

$$LB_r = \frac{a}{b+r} + c,$$

where $LB_r$ is the lower bound, r is traffic flow transmission rate, and a, b, and c, are parameters specific for each particular discontinuous reception (DRX) setting.

18. The device of claim 17, the processing circuit being further configured to find numerical values of the parameters a, b, and c, of the modelled lower bound $LB_r$ of the battery savings using machine learning.

19. The device of claim 10, said device being a radio base station (RBS), a base transceiver station (BTS), a NodeB, an eNodeB, a radio network controller (RNC), a base station controller (BSC), or a proxy server, or a mobile phone, a User Equipment (UE), a personal digital assistant (PDA), a smart phone, a tablet, a laptop, or a media player.

20. A non-transitory computer-readable medium comprising, stored thereupon, a computer program comprising computer-executable instructions that, when executed on a processing circuit of a mobile terminal, operating according to a particular discontinuous reception (DRX) setting in a mobile communications network, cause the mobile terminal to:
- acquire an estimated lower bound (LB) of battery savings as a function of transmission rate for each of at least two traffic flows for the mobile terminal according to the particular discontinuous reception (DRX) setting of the mobile terminal;
- acquire an estimated battery savings measure (UB) for each of the at least two traffic flows;
- shaping each of the at least two traffic flows;
- acquiring an estimated battery savings measure (SB) for each of the at least two traffic flows after the shaping of each of the at least two traffic flows;
- calculating normalized traffic shaper gain (NG) as a relation between the estimated battery savings measure (SB) and the estimated battery savings measure (UB) for each of the at least two traffic flows, said relation further being normalized with the respective estimated lower bound of battery savings; and
- determining whether to use the traffic shaper for the at least two traffic flows on the basis of the calculated normalized traffic shaper gain.

* * * * *